（12）United States Patent
Manry (10) Patent No.: US 10,024,435 B2
(45) Date of Patent: Jul. 17, 2018

(54) SEAL ASSEMBLY WITH BIASING MEMBER RETAINING POCKETS

(71) Applicant: Jared D. Manry, Shrewsbury, PA (US)

(72) Inventor: Jared D. Manry, Shrewsbury, PA (US)

(73) Assignee: KAYDON RING & SEAL, INC., Baltimore, MD (US)

( * ) Notice: Subject to any disclaimer, the term of this patent is extended or adjusted under 35 U.S.C. 154(b) by 0 days.

(21) Appl. No.: 15/157,863

(22) Filed: May 18, 2016

(65) Prior Publication Data

US 2017/0335970 A1    Nov. 23, 2017

(51) Int. Cl.
*F16J 15/34*    (2006.01)

(52) U.S. Cl.
CPC ....... *F16J 15/3452* (2013.01); *F16J 15/3464* (2013.01)

(58) Field of Classification Search
CPC .......................... F16J 15/3452; F16J 15/3464
USPC ................ 277/368, 366, 370, 372, 377, 345
See application file for complete search history.

(56) References Cited

U.S. PATENT DOCUMENTS

| | | | | |
|---|---|---|---|---|
| 2,867,458 A | * | 1/1959 | Kroekel ................. | F16J 15/441 277/543 |
| 4,943,069 A | * | 7/1990 | Jinnouchi ................ | F16J 15/26 277/543 |
| 7,648,143 B2 | * | 1/2010 | Davis .................... | F01D 25/183 277/349 |

* cited by examiner

*Primary Examiner* — Nathan Cumar
(74) *Attorney, Agent, or Firm* — Mark Ussai; SKF USA Inc. Patent Dept.

(57) ABSTRACT

A seal assembly includes first and second generally annular seals disposable about the shaft so as to be spaced apart axially along the shaft central axis. Each seal has an inner circumferential sealing surface and inner and outer axial sides, each inner axial side facing the other seal inner axial side. The first seal has at one or more coupling pockets extending inwardly from the first seal inner axial side and the second seal has one or more retaining pockets extending inwardly from the second seal inner axial side, each retaining pocket being aligned with one coupling pocket. One or more biasing members each have a first end disposed within one coupling pocket and an opposing, second end disposed within one retaining pocket, the biasing member being configured to exert an axial biasing force on each one of the first and second seals.

13 Claims, 9 Drawing Sheets

SEAL ASSEMBLY WITH BIASING MEMBER RETAINING POCKETS

BACKGROUND OF THE INVENTION

The present invention relates to circumferential shaft seals, and more particularly to the structure for axially-biasing tandem circumferential shaft seals.

Double or "tandem" circumferential shaft seals are known and include two axially spaced seals disposed within a common housing. Each seal has an inner circumferential surface sealing engageable with the outer circumferential surface of a rotatable shaft. In order to maintain axial spacing between the two seals, a plurality of biasing members, such as coil springs, extending between the two seals are typically provided.

SUMMARY OF THE INVENTION

In one aspect, the present invention is a seal assembly for sealing about a shaft rotatable about a central axis and having an outer circumferential surface. The seal assembly comprises first and second generally annular seals disposable about the shaft so as to be spaced apart axially along the shaft central axis. Each one of the two seals has an inner circumferential surface for sealing about the shaft outer surface and opposing inner and outer axial sides, and each seal inner axial side faces the other seal inner axial side. The first seal has at least one coupling pocket extending generally axially inwardly from the first seal inner axial side and the second seal has a retaining pocket extending generally axially inwardly from the second seal inner axial side. The retaining pocket is generally aligned with the coupling pocket. Further, at least one biasing member has a first end disposed within the at least one coupling pocket and an opposing, second end disposed within the at least one retaining pocket. The biasing member is configured to exert a generally axial biasing force on each one of the first and second seals.

In another aspect, the present invention is again a seal assembly for sealing about a shaft rotatable about a central axis and having an outer circumferential surface. The seal assembly comprises first and second generally annular seals disposable about the shaft so as to be spaced apart axially along the shaft central axis. Each one of the two seals has an inner circumferential surface for sealing about the shaft outer surface and opposing inner and outer axial sides and each seal inner axial side facing the other seal inner axial side. The first seal has at least one spring coupling pocket extending generally axially inwardly from the first seal inner axial side and having a radial length. The second seal has a spring retaining pocket extending generally axially inwardly from the second seal inner axial side and having a radial length substantially greater than the coupling pocket radial length, the retaining pocket being generally aligned with the coupling pocket. Further, the assembly includes at least one spring having a first end disposed within the at least one coupling pocket and an opposing, second end disposed within the at least one retaining pocket. The spring is configured to exert a generally axial biasing force on each one of the first and second seals. The spring second end is generally radially displaceable within the retaining pocket when at least one of the first and second seals radially displaces relative to the other one of the first and second seals.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
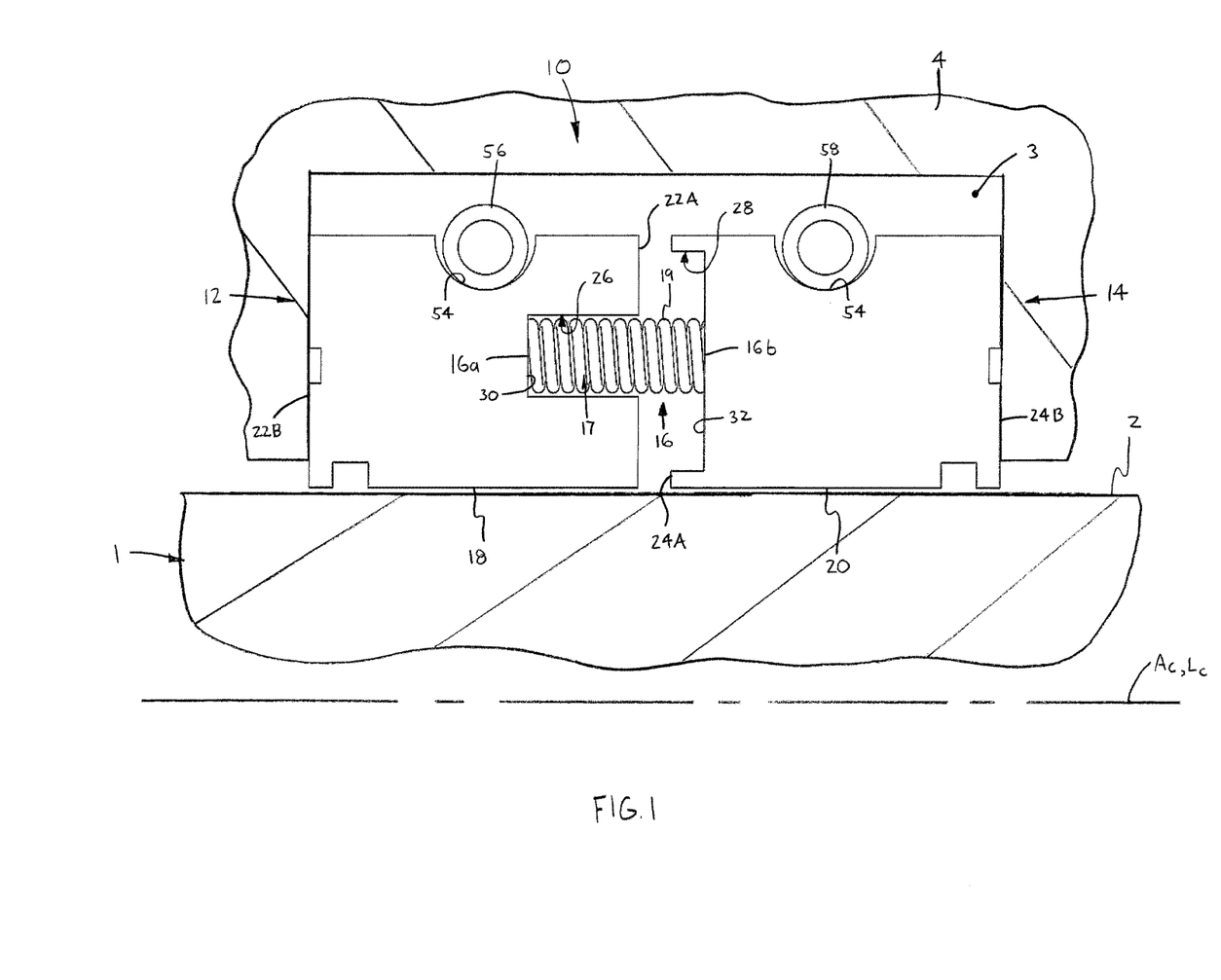
FIG. 1 is a broken-away, axial cross-sectional view of a seal assembly in accordance with the present invention, shown disposed about a shaft and located within a housing.

Referring now to the drawings in detail, wherein like numbers are used to indicate like elements throughout, there is shown in FIGS. 1-14 a seal assembly 10 for sealing about a shaft 1 rotatable about a central axis $A_C$ and having an outer circumferential surface 2. The seal assembly 10 has a centerline $L_C$ (FIG. 1) substantially coaxial with the shaft axis $A_C$ and basically comprises first and second generally annular seals 12, 14, respectively, and at least one and preferably a plurality of biasing members 16. The first and second seals 12, 14 are disposable about the shaft 1 so as to be spaced apart axially along the shaft central axis $A_C$, and are preferably disposed within an annular channel 3 of a housing 4 (FIG. 1). Each biasing member 16 is configured to exert a generally axial biasing force on each one of the first and second seals 12, 14, so as to maintain axial spacing of the two seals 12, 14. Also, each one of the two seals 12, 14 has an inner circumferential surface 18, 20 for sealing about the shaft outer surface 2, which is provided by the shaft 1 itself or a sleeve, runner or other component mounted on the shaft 1, and opposing inner and outer axial sides 22A, 22B and 24A, 24B, respectively. The seals 12, 14 are arranged such that each seal inner axial side 22A, 24A faces the other seal inner axial side 24A, 22A, respectively.

Further, the first seal 12 has at least one coupling pocket 26 extending generally axially inwardly from the first seal inner axial side 22A and is configured to "loosely" couple the biasing member 16 with the seal 12. The second seal 14 has at least one retaining pocket 28 extending generally axially inwardly from the second seal inner axial side 24A, which is generally aligned with a proximal coupling pocket 26. With this structure, each biasing member 16 is installed within the seal assembly 10 such that a biasing member first end 16a is disposed within the one coupling pocket 26 and an opposing, second end 16b disposed within the retaining pocket 28 aligned with the particular coupling pocket 26. Further, each of one of the coupling pockets 26 and the retaining pockets 28 has a radial length $l_{RC}$, $l_{RR}$, respectively, i.e., a dimension along a radius through the seal assembly centerline $L_C$. The pockets 26, 28 are relatively sized so that the retaining pocket radial length $l_{RR}$ is substantially greater than the coupling pocket radial length $l_{RC}$. As such, the second end 16b of each biasing member 16 is generally radially displaceable within the associated retaining pocket 28 when at least one of the first and second seals 12, 14 radially displaces relative to the other one of the first and second seals 14, 12, as depicted in FIGS. 13 and 14.

More specifically, the coupling and retaining pockets 26, 28 each have a bottom end surface 30, 32, respectively, spaced axially from the seal body axial end 22A, 24A, respectively, and an inner enclosed sidewall surface 34, 36, respectively, extending between the respective axial end 22A, 24A and the respective bottom surface 30, 32. The sidewall surface 34 of the retaining pocket 26 is preferably sized slightly larger than an outer surface 19 (FIG. 2) of the biasing member 16, as discussed below, and the pockets 26, 28 are arranged such that the bottom end surface 30, 32 of each pocket 26, 28 faces generally toward the bottom end surface 32, 30 of the other pocket 28, 26. With this pocket structure, the biasing member 16 extends axially between the two bottom end surfaces 30, 32 and exerts biasing force against each surface 30, 32, and thereby on the seals 12, 14. Further, the retaining pocket end surface 32 is sized substantially larger than the coupling pocket end surface 30, such that the biasing member second end 16b is slidably displaceable against the retaining pocket end surface 32 while the first end 16a remains generally stationary with respect to the first seal 12, when one of the first and second seals 12, 14 displaces relative to the other one of the two seals 14, 12.

Figure 13:
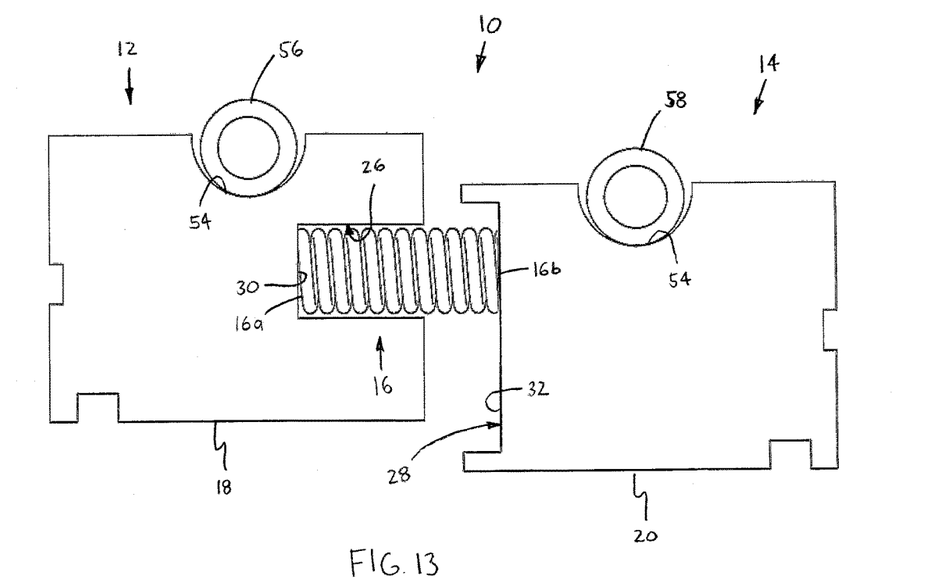
FIG. 13 is an axial cross-sectional view of the seal assembly separate from the shaft and housing, showing relative radial displacement between the two seals in a first radial direction.
Figure 14:
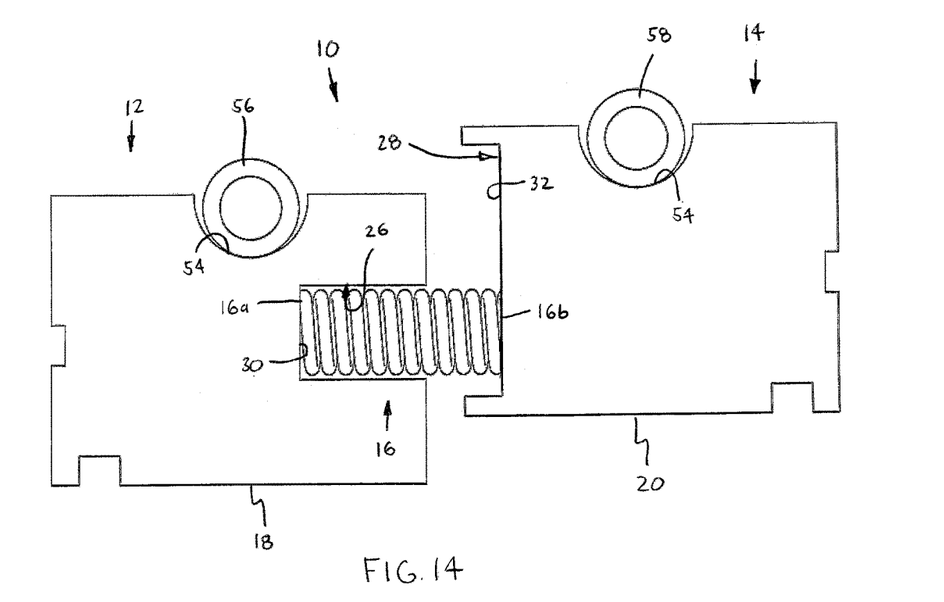
FIG. 14 is an axial cross-sectional view of the seal assembly separate from the shaft and housing, showing relative radial displacement between the two seals in a second radial direction.

By providing the retaining pockets 28, when there is relative displacement between the two seals 12, 14 (particularly radial displacement, but also relative angular displacement), the biasing member second end 16b moves within the retaining pocket 28, as depicted in FIGS. 13 and 14, as opposed to sliding against the second seal end surface 24A. Therefore, each biasing member 16 stays coupled with both seals 12, 14, as opposed to sliding off the seal end 24A and becoming dislodged from the assembly 10, and remains substantially undamaged (e.g., by being "pinched" under the inner circumferential surface 20), during relative displacement of the first and second seals 12, 14. Such relative seal displacement may occur during assembly/disassembly of the seals 12, 14 or transient, extreme engine conditions leading to excessive vibration or shaft displacement, etc.

Figure 3:
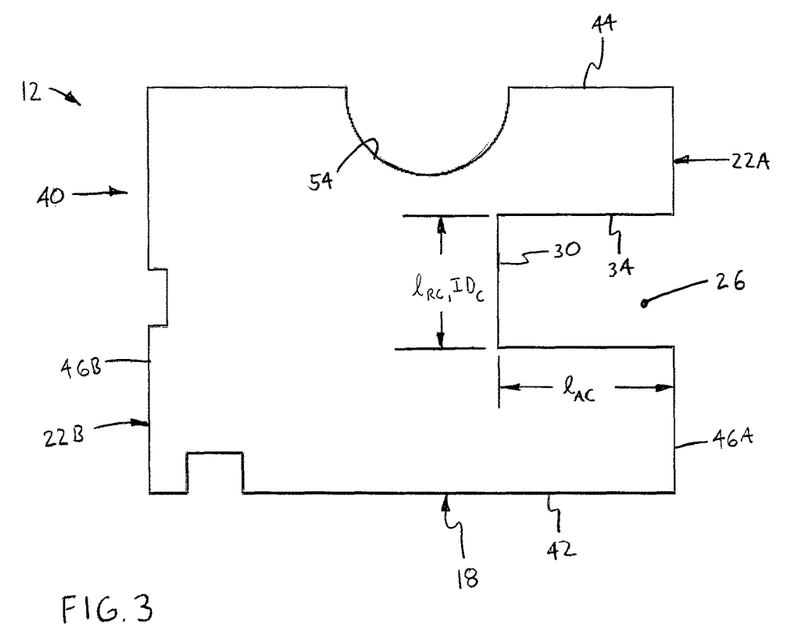
FIG. 3 is an axial cross-sectional view of a first seal of FIG. 2.
Figure 4:
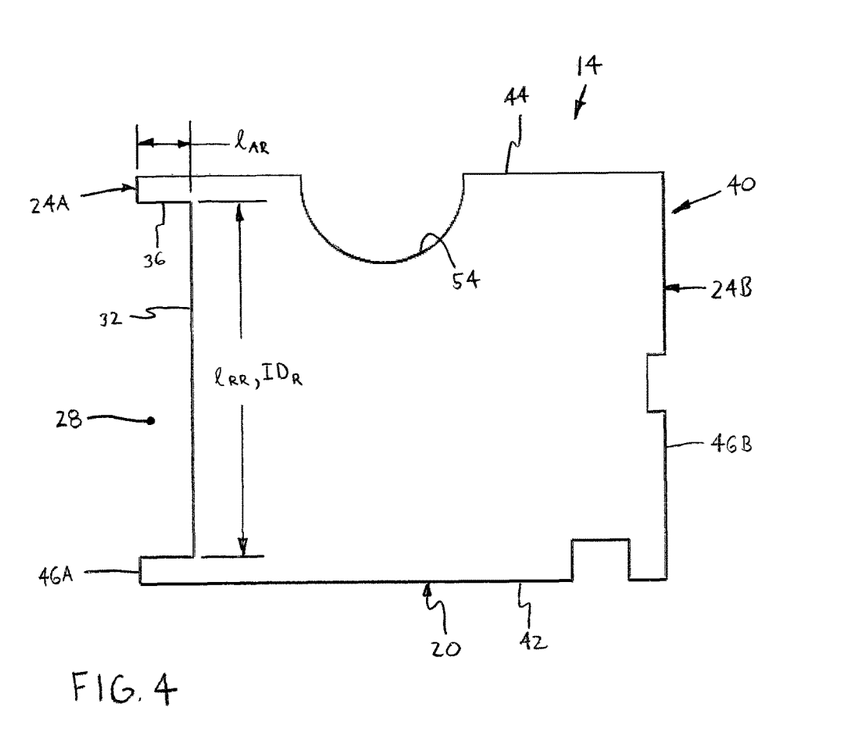
FIG. 4 is an axial cross-sectional view of a second seal of FIG. 2.
Figure 5:
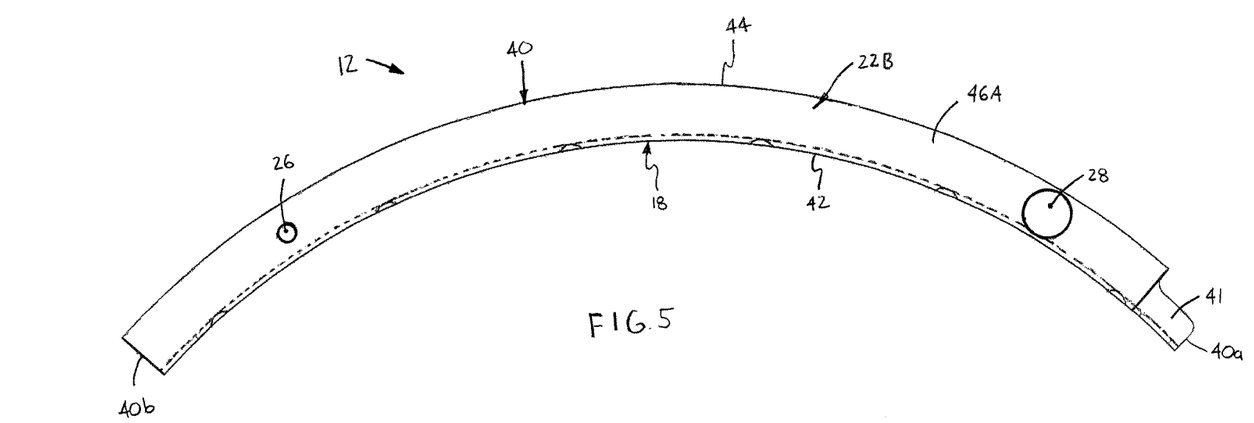
FIG. 5 is an inner side view of one body segment of the first seal.
Figure 6:
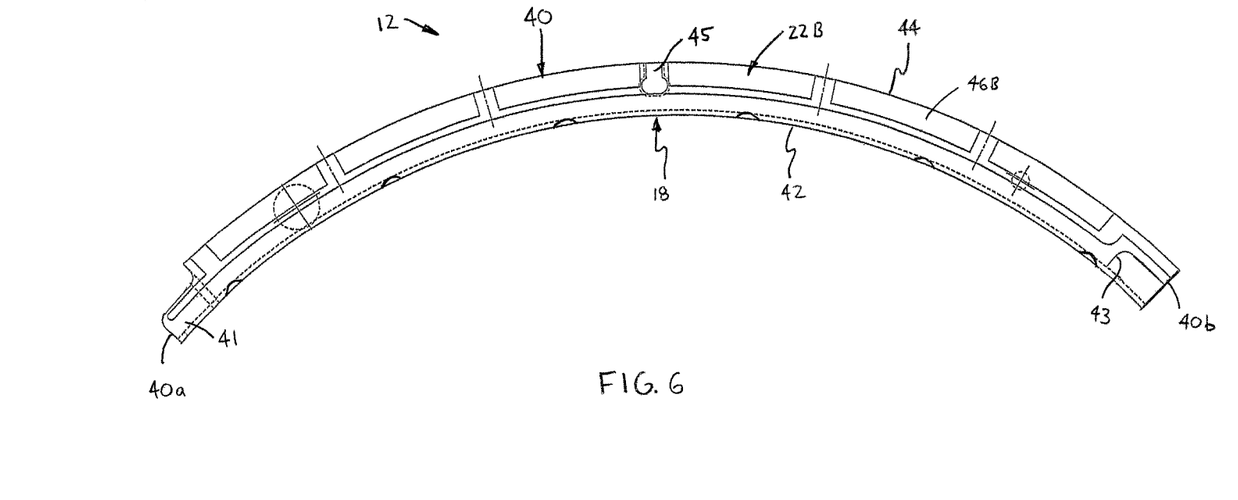
FIG. 6 is an outer side view of one body segment of the first seal.
Figure 7:
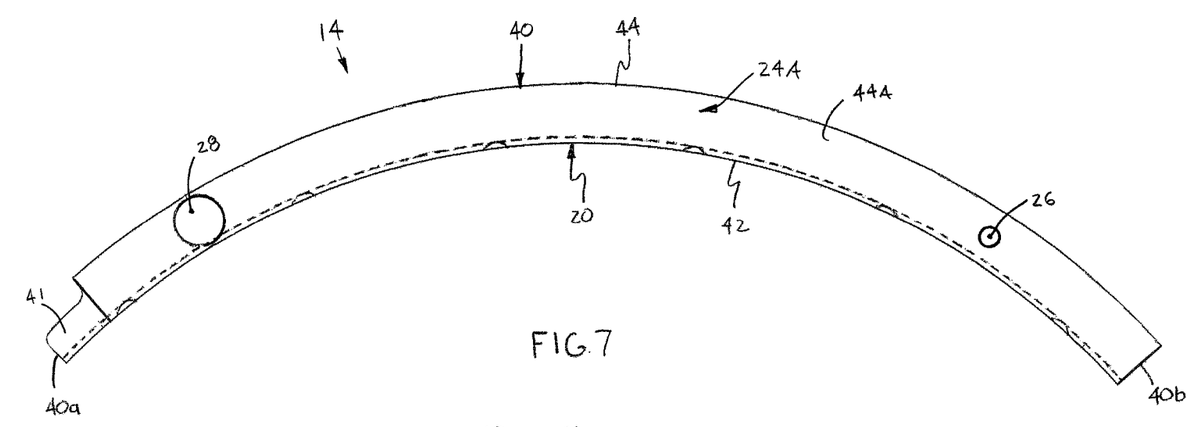
FIG. 7 is an inner side view of one body segment of the second seal.
Figure 8:
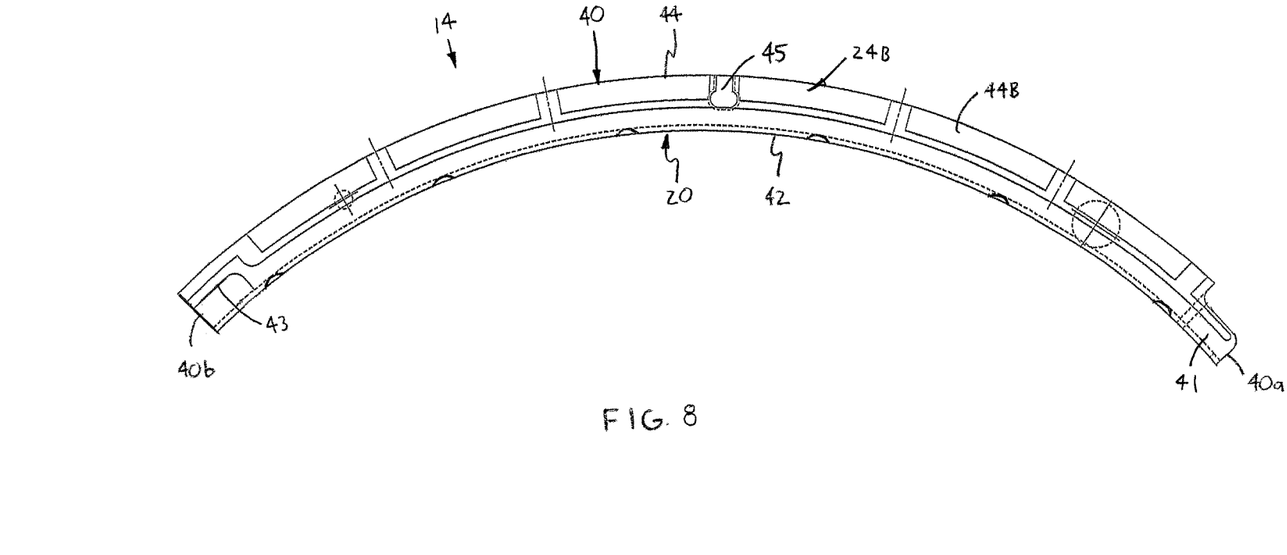
FIG. 8 is an outer side view of one body segment of the second seal.
Figure 9:
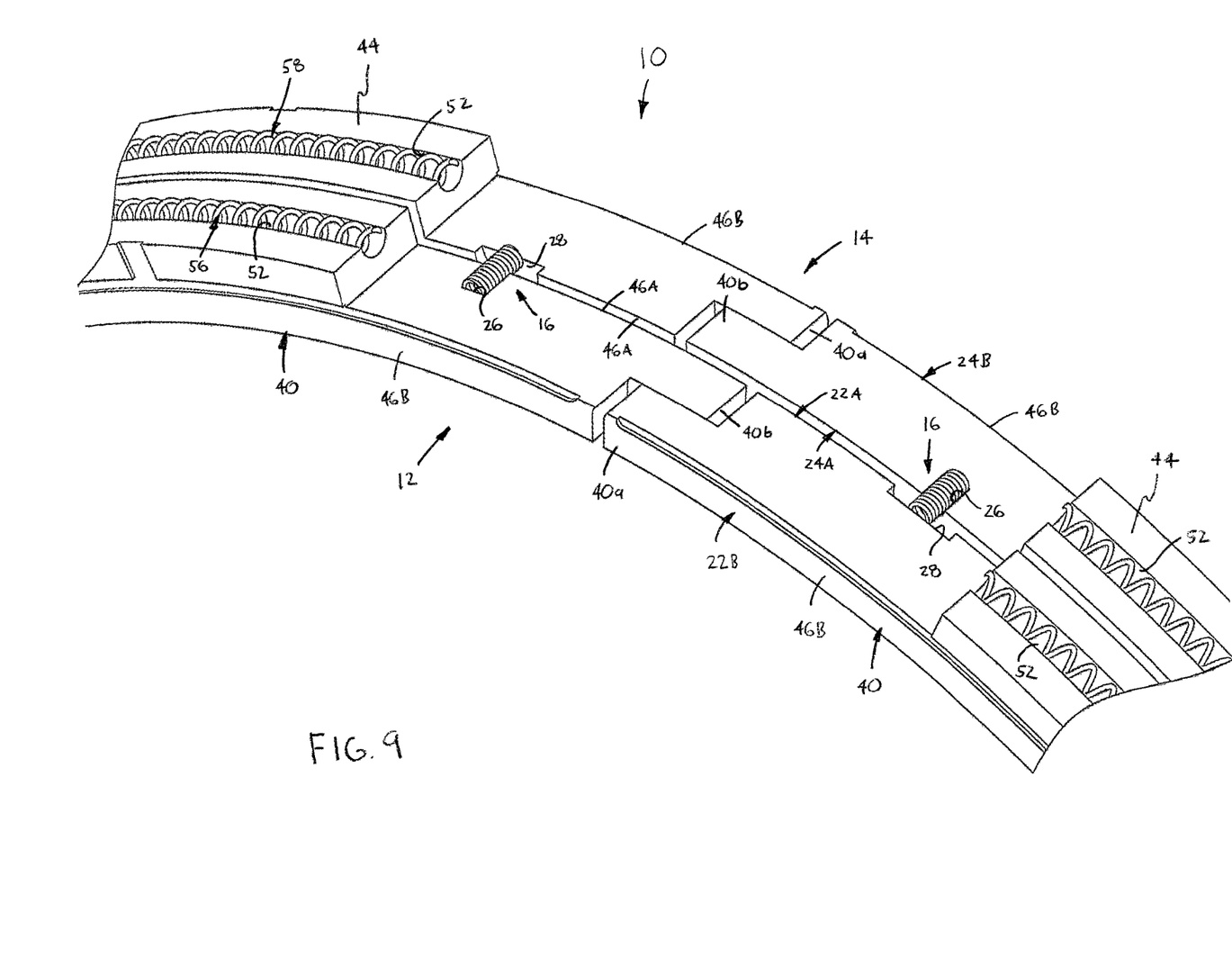
FIG. 9 is broken-away, perspective view of the seal assembly.
Figure 10:
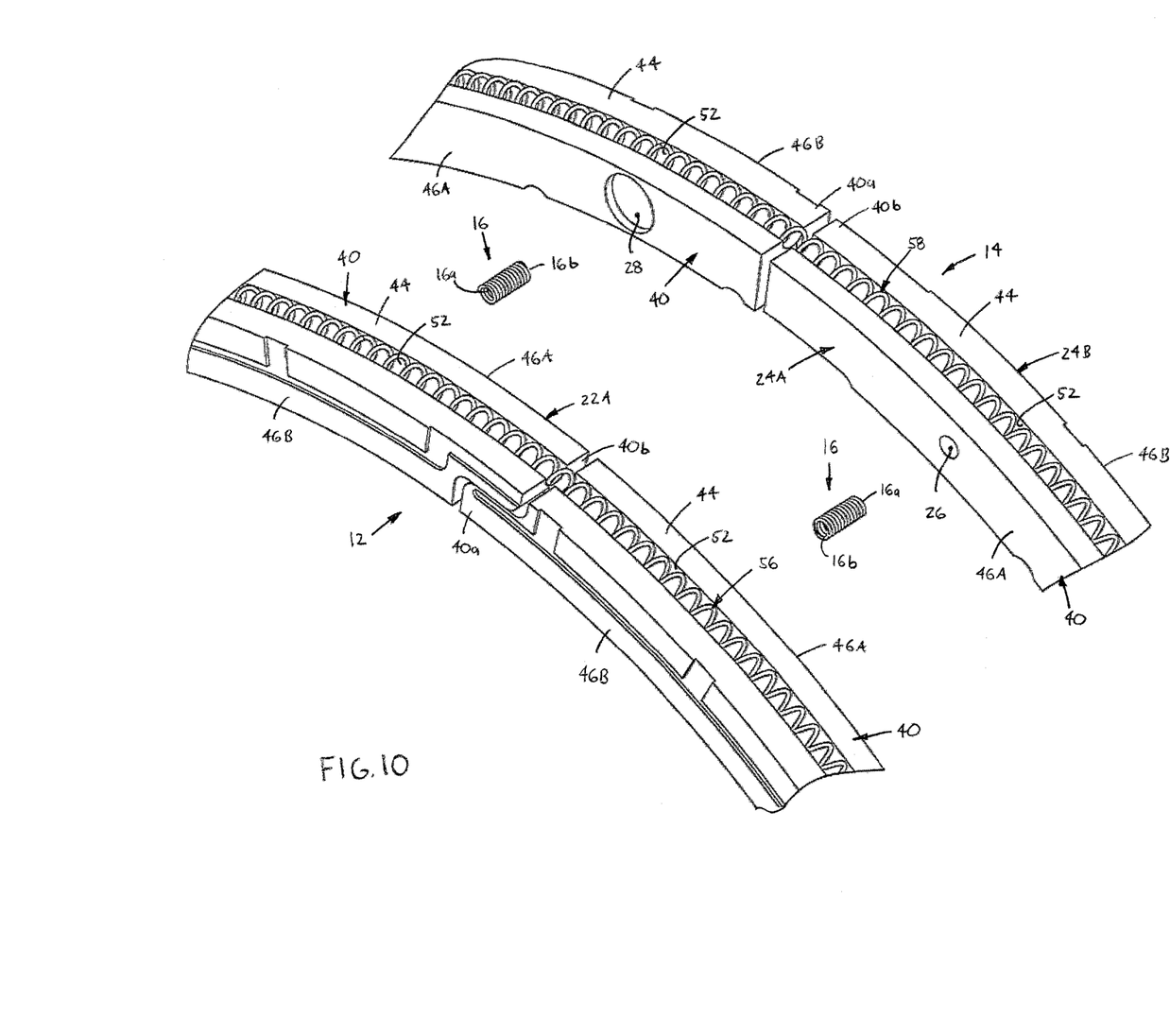
FIG. 10 is a broken-away, exploded perspective view of the seal assembly.
Figure 11:
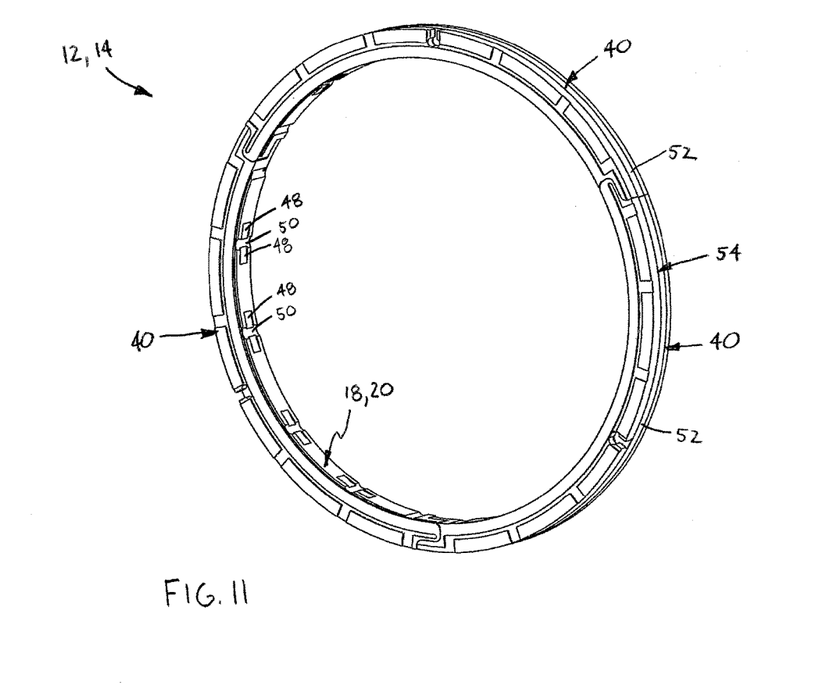
FIG. 11 is a side perspective view of one seal body formed of a plurality of body segments.
Figure 12:
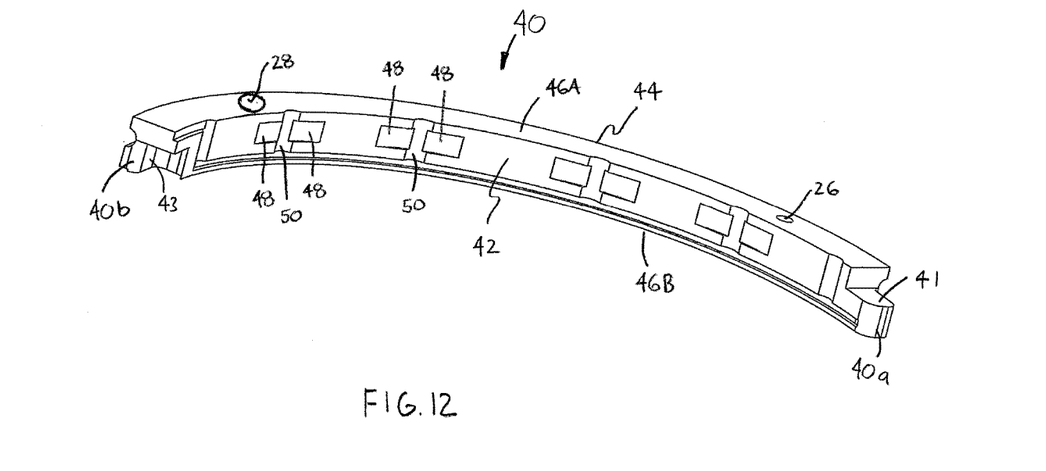
FIG. 12 is an inner perspective view of one seal body segment.

Referring now to FIGS. 3-5, 7, 9, 10 and 12, each one of the coupling and retaining pockets 26, 28 is preferably generally circular cylindrical, such that each inner sidewall surface 34, 36 is a circular inner circumferential surface with an inner diameter $ID_C$, $ID_R$, respectively, providing the radial length $l_{RC}$, $l_{RR}$, as discussed above. However, the pockets 26, 28 may alternatively be formed with inner sidewall surfaces 34, 36 of any other desired shape, such as rectangular, hexagonal, etc. With the preferred circular cylindrical pockets 26, 28, the retaining pocket inner diameter $ID_R$ is preferably at least two (2) times greater, and more preferably about two and a half (2.5) times greater, than the coupling pocket inner diameter $ID_C$. Also, as indicated in FIGS. 3 and 4, the coupling pocket 26 and the retaining pocket 28 each have an axial length $l_{AC}$, $l_{AR}$, respectively, and the coupling pocket axial length $l_{AC}$ is substantially greater than the retaining pocket axial length $l_{AR}$, which is preferably relatively shallow (e.g., 0.030"). As such, each biasing member 16 is disposed substantially "deeper" within the coupling pocket 26 as compared with its depth into the associated retaining pocket 28.

Figure 2:
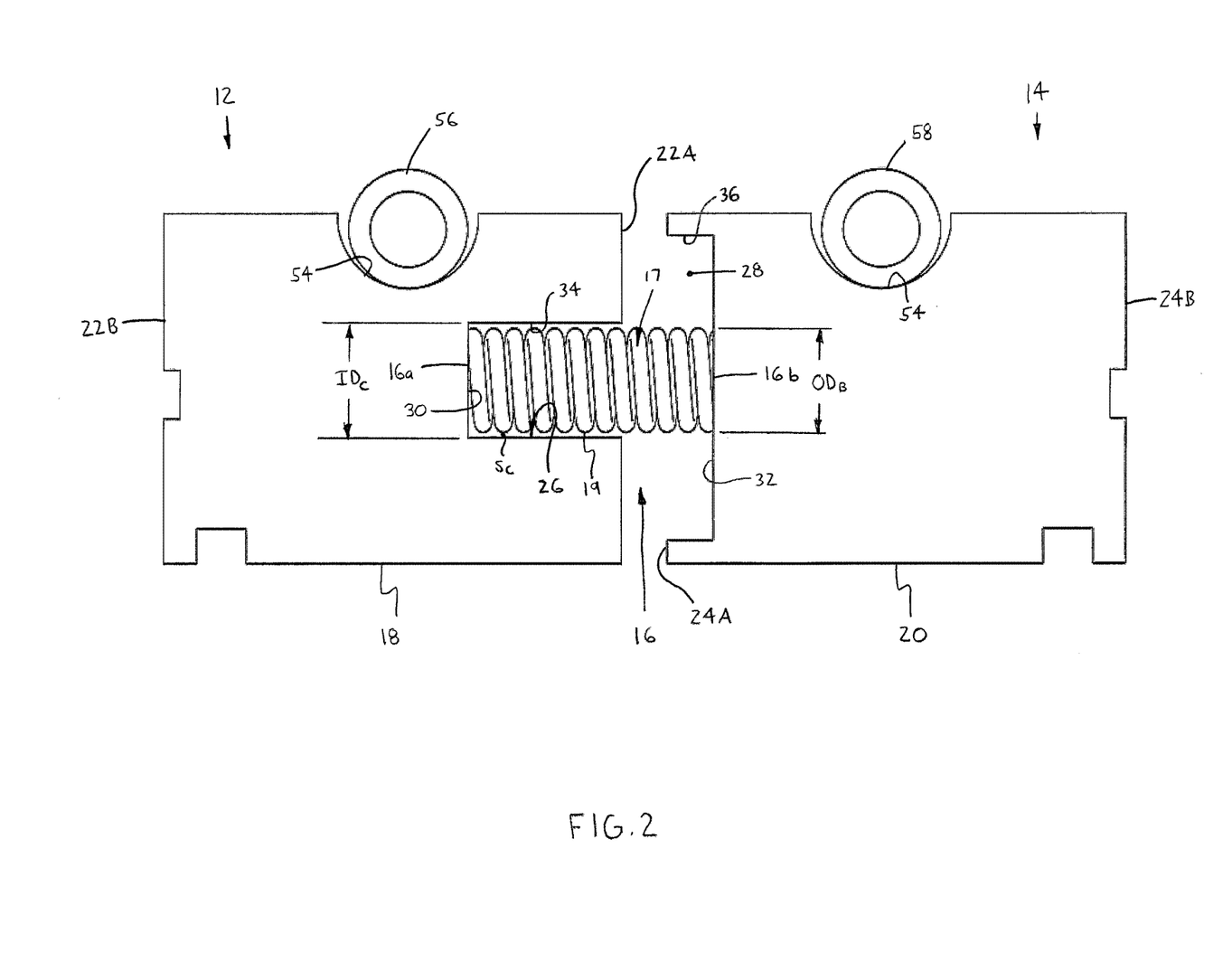
FIG. 2 is an axial cross-sectional view of the seal assembly separate from the shaft and housing.

Furthermore, each biasing member 16 preferably has a generally circular cylindrical body 17 with an outer circumferential surface 19 and an outer diameter $OD_B$ sized "slightly" lesser than the coupling pocket inner diameter $ID_C$ (FIG. 2). As such, a generally minimal clearance space $s_C$ is defined between the biasing member 16 and the coupling pocket inner surface 34, as indicated in FIG. 2, so as to generally loosely retain the biasing member 16 within the coupling pocket 26. Most preferably, the biasing member 16 is formed as or includes a coil compression spring, such that the cylindrical body 17 is comprised of a plurality of coils each having a diameter about equal to the body outer diameter $OD_B$ and an outer surface section collectively providing the body outer surface 19. However, the biasing member 16 may alternatively be formed in any other appropriate manner, such as a solid rod of elastomeric material, a volute spring, etc., as long as the biasing member 16 is capable of functioning as generally described herein.

Referring to FIGS. 3-12, in many preferred applications, each one of the first and second seals 12, 14 is a circumferential shaft seal formed of a plurality of generally arcuate body segments 40. Each arcuate body segment 40 has opposing circumferential ends 40a, 40b coupled to the end 40b, 40a of an adjacent segment 40 to form the annular seal 12 or 14. Preferably, each first end 40a includes a projection 41 and each second end 40b includes a cavity or recess 43 sized to receive the projection 41 from an adjacent body segment 40. Further, each body segment 40 also has opposing inner and outer circumferential surface sections 42, 44, respectively, and inner and outer axial ends 46A, 46B, respectively. The inner surface sections 42 of all the body segments 40 collectively form the body inner sealing surface 18 or 20 of the first and second seals 12, 14, respectively.

Also, each arcuate body segment 40 preferably further includes a slot 45 for receiving an anti-rotation pin (not shown).

In certain preferred applications, each arcuate body segment 40 has at least one lift pocket 48 extending generally outwardly from the inner surface section 42 and configured to receive fluid, preferably from an axial bleed slot 50, such that the segment 40 is biased generally radially outwardly with respect to the central axis $A_C$ when the shaft 1 rotates within the seals 12, 14. Further, each arcuate body segment 40 preferably has an elongated channel 52 extending inwardly from the outer surface and circumferentially between the two segment ends 40a, 40b, the channels 52 of the plurality of segments 40 collectively form a generally annular groove 54. Additionally, the seal assembly 10 preferably further comprises two generally annular biasing members 56, 58, each preferably a garter spring, each disposed with the annular groove 54 of a separate one of the first and second seals 12, 14. The annular biasing members 56, 58 are configured to bias the plurality of arcuate body segments 40 generally radially inwardly to maintain the sealing surfaces 18, 20 generally proximal to the shaft outer surface 2.

With seals 12, 14 formed of a plurality of segments 40, each first seal arcuate segment 40 preferably has at least one coupling pocket 26 and each second seal arcuate segment 40 preferably has at least one retaining pocket 28. As such, the seal assembly 10 comprises a plurality of the biasing members 16 each disposed in a separate one of the coupling pockets 26 and simultaneously within a separate, aligned one of the retaining pockets 28. Most preferably, each first seal arcuate segment 40 further includes a retaining pocket 28 extending axially inwardly from the first seal inner axial side 22A and each second seal arcuate segment 40 includes a coupling pocket 26 extending axially inwardly from the second seal inner axial side 24A and generally aligned with one of the first seal retaining pockets 28. Further, the seal assembly 10 preferably further comprises a second plurality or set of biasing members 16 each having a first end 16a disposed within one of the second seal coupling pockets 26 and a second end 16b disposed within one of the first seal retaining pockets 28.

The additional pockets 26, 28 are preferably located on the second seal 14 and the first seal 12, respectively, such that each arcuate body segment 40 of each seal 12, 14 is generally symmetrical with the facing body segment 40 of the other seal 14, 12. Thereby, all the segments 40 of both the first and second seals 12, 14 are preferably identically formed or fabricated and are interchangeable between the two seals 12, 14. Alternatively, the seal body segments 40 of the first seal 12 may be identical with each other, but different from the segments of the second seal 14, and vice-versa. As a further alternative, each of the first and second seals 12, 14 may be of one-piece construction, i.e., not formed of multiple segments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A seal assembly for sealing about a shaft rotatable about a central axis and having an outer circumferential surface, the seal assembly comprising:

first and second generally annular seals disposable about the shaft so as to be spaced apart axially along the shaft central axis, each one of the two seals having an inner circumferential surface for sealing about the shaft outer surface and opposing inner and outer axial sides, each seal inner axial side facing the other seal inner axial side, the first seal having at least one coupling pocket extending generally axially inwardly from the first seal inner axial side and the second seal having a retaining pocket extending generally axially inwardly from the second seal inner axial side, the retaining pocket being generally aligned with the coupling pocket; and at least one biasing member having a first end disposed within the at least one coupling pocket and an opposing, second end disposed within the at least one retaining pocket, the biasing member being configured to exert a generally axial biasing force on each one of the first and second seals;

wherein each of one of the coupling pocket and retaining pocket has a radial length, the retaining pocket radial length being substantially greater than the coupling pocket radial length such that the second end of the biasing member is generally radially displaceable within the retaining pocket when at least one of the first and second seals radially displaces relative to the other one of the first and second seals.

2. The seal assembly as recited in claim 1 wherein each one of the coupling pocket and the retaining pocket has a bottom end surface generally facing toward the bottom end surface of the other pocket, the biasing member extends axially between the two bottom end surfaces, the retaining pocket end surface being sized substantially larger than the coupling pocket end surface such that the biasing member second end is slidably displaceable against the retaining pocket end surface when one of the first and second seals radially displaces relative to the other one of the two seals.

3. The seal assembly as recited in claim 1 wherein each one of the coupling and retaining pockets has an inner circumferential surface with an inner diameter and the retaining pocket diameter is at least two times greater than the coupling pocket diameter.

4. The seal assembly as recited in claim 3 wherein the biasing member has an outer diameter sized lesser than the coupling pocket inner diameter such that a generally minimal clearance space is defined between the biasing member and the coupling pocket inner surface.

5. The seal assembly as recited in claim 1 wherein the coupling pocket and the retaining pocket each have an axial length, the coupling pocket axial length being substantially greater than the retaining pocket axial length.

6. The seal assembly as recited in claim 1 wherein the biasing member includes a coil compression spring.

7. The seal assembly as recited in claim 1 wherein each one of the first and second seals is formed of a plurality of generally arcuate body segments, each arcuate body segment having opposing circumferential ends coupled to the end of an adjacent segment, each first seal arcuate segment having at least one coupling pocket and each second seal arcuate segment having at least one retaining pocket, and the seal assembly comprises a plurality of the biasing members each disposed in a separate one of the coupling pockets and within a separate one of the retaining pockets.

8. The seal assembly as recited in claim 7 wherein each arcuate segment has at least one lift pocket configured to receive fluid such that the segment is biased generally radially outwardly with respect to the central axis when the shaft rotates within the seals.

9. The seal assembly as recited in claim 7 wherein each arcuate segment has an outer circumferential surface and an elongated channel extending inwardly from the outer surface and circumferentially between the two segment ends, the channels of the plurality of channels forming a generally annular groove and the seal assembly further comprises two generally annular biasing members each disposed with the annular groove of a separate one of the first and second seals and configured to bias the plurality of arcuate body segments generally radially inwardly.

10. The seal assembly as recited in claim 7 wherein each first seal arcuate segment further includes a retaining pocket extending axially inwardly from the first seal inner axial side, each second seal arcuate segment includes a coupling pocket extending axially inwardly from the second seal inner axial side and generally aligned with one of the first seal retaining pockets, and the seal assembly further comprises a plurality of biasing members each having a first end disposed within one of the second seal coupling pockets and a second end disposed within one of the first seal retaining pockets.

11. The seal assembly as recited 1 wherein the first seal has a plurality of the coupling pockets, the second seal has a plurality of the retaining pockets and the at least one biasing member includes a plurality of biasing member, each biasing member having one end disposed within a separate one of the coupling pockets and a second end disposed within a separate one of the retaining pockets.

12. The seal assembly as recited in claim 1 further comprising a housing disposed circumferentially about the shaft and having a generally annular interior channel, the first and second seals being disposed within the housing channel.

13. A seal assembly for sealing about a shaft rotatable about a central axis and having an outer circumferential surface, the seal assembly comprising:

first and second generally annular seals disposable about the shaft so as to be spaced apart axially along the shaft central axis, each one of the two seals having an inner circumferential surface for sealing about the shaft outer surface and opposing inner and outer axial sides, each seal inner axial side facing the other seal inner axial side, the first seal having at least one spring coupling pocket extending generally axially inwardly from the first seal inner axial side and having a radial length, and the second seal having a spring retaining pocket extending generally axially inwardly from the second seal inner axial side and having a radial length substantially greater than the coupling pocket radial length, the retaining pocket being generally aligned with the coupling pocket; and at least one spring having a first end disposed within the at least one coupling pocket and an opposing, second end disposed within the at least one retaining pocket, the spring being configured to exert a generally axial biasing force on each one of the first and second seals, the spring second end being generally radially displaceable within the retaining pocket when at least one of the first and second seals radially displaces relative to the other one of the first and second seals;

wherein each of one of the coupling pocket and retaining pocket has a radial length, the retaining pocket radial length being substantially greater than the coupling pocket radial length such that the second end of the spring is generally radially displaceable within the retaining pocket when at least one of the first and second seals radially displaces relative to the other one of the first and second seals.

* * * * *